(12) United States Patent
Minakuchi

(10) Patent No.: US 6,738,117 B2
(45) Date of Patent: May 18, 2004

(54) LIQUID CRYSTAL DISPLAY DEVICE

(75) Inventor: Keiichi Minakuchi, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 19 days.

(21) Appl. No.: 09/929,067

(22) Filed: Aug. 15, 2001

(65) Prior Publication Data

US 2002/0047969 A1 Apr. 25, 2002

(30) Foreign Application Priority Data

Aug. 31, 2000 (JP) ........................................ 2000-262674
Feb. 8, 2001 (JP) ........................................ 2001-032041

(51) Int. Cl.[7] ............................................ G02F 1/1335
(52) U.S. Cl. ........................ 349/118; 349/119; 349/120
(58) Field of Search ....................... 349/118, 18, 119, 349/176, 202, 120, 106

(56) References Cited

U.S. PATENT DOCUMENTS

| 5,657,140 | A | * | 8/1997 | Xu et al. .................... 349/118 |
| 5,743,980 | A | * | 4/1998 | Hsieh et al. ................. 156/99 |
| 5,929,946 | A | * | 7/1999 | Sharp et al. .................. 349/18 |
| 5,999,240 | A | * | 12/1999 | Sharp et al. ................ 349/119 |
| 6,020,945 | A | | 2/2000 | Sawai et al. ................. 349/119 |
| 6,133,980 | A | * | 10/2000 | Faris ........................... 349/176 |
| 6,147,741 | A | * | 11/2000 | Chen et al. .................. 349/202 |
| 6,208,396 | B1 | * | 3/2001 | Shimizu et al. ............. 349/119 |

FOREIGN PATENT DOCUMENTS

| EP | 1 081 636 A2 | 3/2001 |
| JP | 05-127822 | 5/1993 |
| JP | 10-48625 | 2/1998 |

* cited by examiner

Primary Examiner—John F. Niebling
Assistant Examiner—Walter L. Lindsay, Jr.
(74) Attorney, Agent, or Firm—Sughrue Mion, PLLC

(57) ABSTRACT

The present invention provides a liquid crystal display device comprising: a laminated protection panel composed of a λ/4-plate, a polarizing plate and a transparent protection plate; a liquid crystal display; and a phase retarder;

wherein the laminated protection panel is disposed to a top surface of a liquid crystal display with a distance, the phase retarder is disposed between the laminated protection panel and the liquid crystal display, and the sum $(\alpha_A+\alpha_B)$ of a wavelength dispersion $(\alpha_A)$ of the λ/4-plate and a wavelength dispersion $(\alpha_B)$ of the phase retarder is in the range of 1.11 to 1.95. In this liquid crystal display device having a transparent protection plate such as a touch panel, coloring of a displayed view looked at in an oblique direction is improved while maintaining a display quality in a front direction.

9 Claims, 4 Drawing Sheets

LIQUID CRYSTAL DISPLAY DEVICE

BACKGROUND OF THE INVENTION

1. Field of the Invention

The present invention relates to a liquid crystal display device having a transparent protection plate, and more particularly, to a liquid crystal display device having a protection plate and exhibiting improvement in brightness, visibility and viewing angle characteristic.

2. Description of the Related Art

A pen entry technology, which allows easy manipulations as if one is writing on a paper with a pencil, has become important owing to a trend toward diversification of information equipment and reduction in size and weight of portable terminals, and therefore, display devices having a touch panel which realizes both inputting and displaying are in a popular use. While various types of touch panels such as an optical type, an ultrasound type, a resistive membrane type, an electrostatic capacitance type, an electromagnetic induction type and the like are presently put to practical use, a transparent protection plate is usually used at a top surface of a touch panel in any type for the purpose of detecting an input signal or protecting a viewing screen. That is, a transparent protection plate is disposed to a top surface of a touch panel, or a transparent protection plate itself forms the touch panel. In addition, a liquid crystal display, which is thin in thickness and light in weight and consumes little electricity, is in a frequent use for the purpose of displaying. Especially a ferroelectric liquid crystal display has an orientation defect when subjected to external shock, a transparent protection plate which is disposed in front of the ferroelectric liquid crystal display serves as protection of a liquid crystal layer against the external shock.

In such a liquid crystal display device having a transparent protection plate, since there is reflection from the transparent protection plate in addition to surface reflection from the liquid crystal display, a displayed view shows extremely poor in a bright room or in the open air. As a solution of this visibility problem, Japanese Patent Application Laid-Open No. 5-127822 proposes to use a circular polarizing plate comprising a λ/4-plate and a polarizing plate. Meanwhile, Japanese Patent Application Laid-Open No. 10-48625 proposes a method for improving a display quality, in which another λ/4-plate is disposed between a liquid crystal display device and a touch panel having a circular polarizing plate. The later publication describes that the λ/4-plate which forms the circular polarizing plate and the another λ/4-plate are arranged so that the directions of orientation axes (optical axes) of the two λ/4-plates are in the same direction, or perpendicular to each other, and the perpendicular-direction arrangement is preferable because of better visibility.

However, such a structure that the λ/4-plate which forms the circular polarizing plate and the another λ/4-plate are arranged so as to have the direction of their orientation axes arranged perpendicular to each other in order to cancel a phase retardation has been found to have a problem that a displayed view looks yellow when viewed from an oblique direction. In the meantime, when the two λ/4-plates are arranged so that the direction of their orientation axes are parallel to each other and the two λ/4-plates function as a λ/2-plate, the visibility deteriorates as described in the publication above.

SUMMARY OF THE INVENTION

An object of the present invention is to provide a liquid crystal display device having a protection plate and exhibiting improvement in brightness, visibility and viewing angle characteristic.

As a result of dedicated efforts to solve these problems, the present inventor discovered that it is possible to improve coloring of a displayed view in an oblique direction while maintaining a display quality in a front direction by means of such combination of a λ/4-plate and a phase retarder that the sum $(\alpha_A+\alpha_B)$ of the wavelength dispersion $(\alpha_A)$ of the λ/4-plate, which forms a circular polarizing plate, and the wavelength dispersion $(\alpha_B)$ of a phase retarder, which is disposed between a transparent protection film and a liquid crystal display, is in the range of 1.11 to 1.95, thereby arriving at the present invention.

That is, the present invention provides a liquid crystal display device comprising:

a laminated protection panel composed of a λ/4-plate, a polarizing plate and a transparent protection plate;

a liquid crystal display; and a phase retarder;

wherein the laminated protection panel is disposed to a top surface of a liquid crystal display with a distance, the phase retarder is arranged between the laminated protection panel and the liquid crystal display, and the sum $(\alpha_A+\alpha_B)$ of a wavelength dispersion $(\alpha_A)$ of the λ/4-plate and a wavelength dispersion $(\alpha_B)$ of the phase retarder is in the range of 1.11 to 1.95.

DETAILED DESCRIPTION OF THE INVENTION

Figure 1:
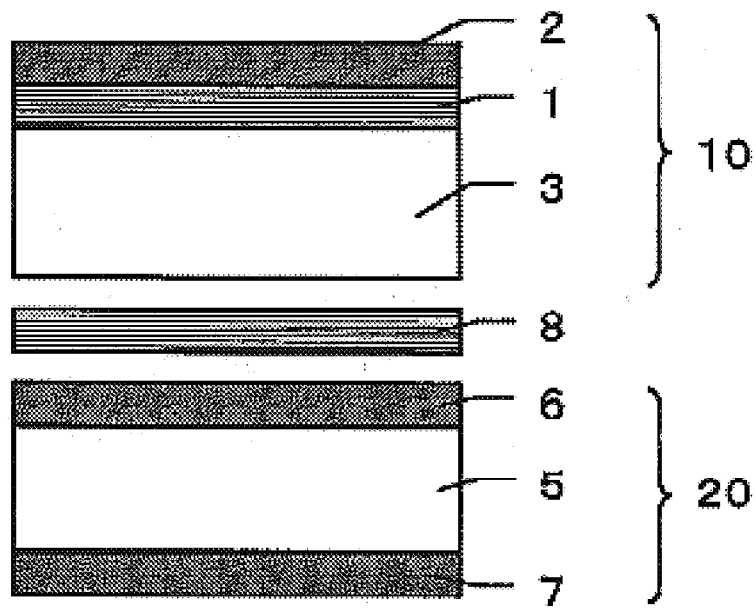
FIG. 1 is a cross sectional view schematically showing an example of a liquid crystal display device of the present invention.

The wavelength dispersion α is a parameter which is expressed as a ratio ($\alpha=R_{450}/R_{590}$) of retardation $R_{450}$ at a measuring wavelength of 450 nm to retardation $R_{590}$ at a measuring wavelength of 590 nm, and is inherent to a material. Describing what this means, for example, since it can be said that any λ/4-plate ideally generates a phase retardation which corresponds to ¼ of wavelength for any wavelength, it is preferable as the wavelength dispersion α becomes closer to 450/590(≈0.76). Since a λ/4-plate and a phase retarder are used in combination in the present invention, as the sum ($\alpha_A+\alpha_B$) of two wavelength dispersions becomes closer to 1.53 which is double the ideal value above, it is possible to improve a displayed view in a front direction particularly in the case where the orientation axes of the λ/4-plate and the phase retarder two are not arranged perpendicular to each other. The sum of two wavelength dispersions being close to 1.53 in this manner contributes to improvement of a displayed view in an oblique direction as well. While the direction of the orientation axis of the phase retarder can be freely set in the range of 0±90 degrees with respect to the direction of the orientation axis of the λ/4-plate which forms a laminated protection panel, for further improving a displayed view in an oblique direction, it is advantageous to ensure that the direction of the orientation axes of the λ/4-plate and the phase retarder are within the range of 0±45 degrees. On the other hand, the combination of the λ/4-plate and the phase retarder allows to improve a displayed view in an oblique direction even where the direction of the orientation axes of the λ/4-plate and the phase retarder are perpendicular to each other. Hence, in the present invention, it is also possible to arrange the direction of the orientation axis of the phase retarder in the range of 90±45 degrees with respect to the direction of the orientation axis of the λ/4-plate which forms a laminated protection panel.

In the following, the present invention will be described in more detail while referring to the drawings.

Figure 2:
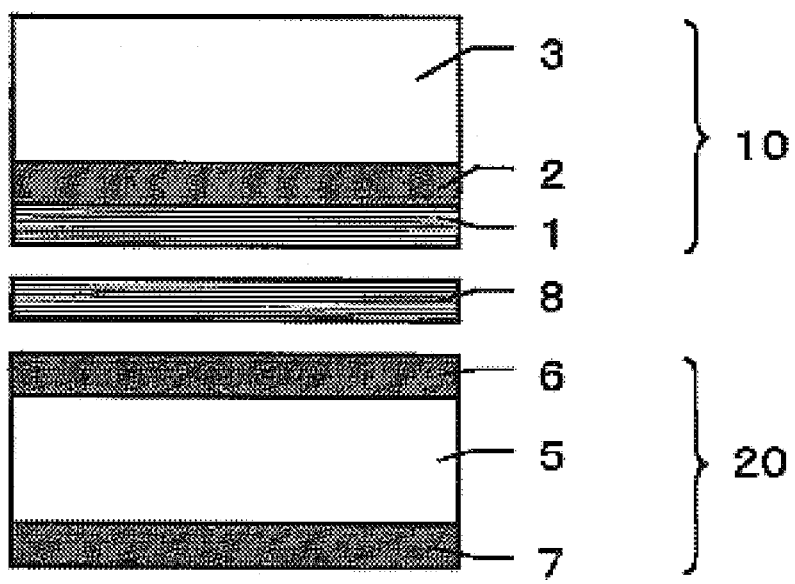
FIG. 2 is a cross sectional view schematically showing another example of a liquid crystal display device of the present invention.
Figure 3:
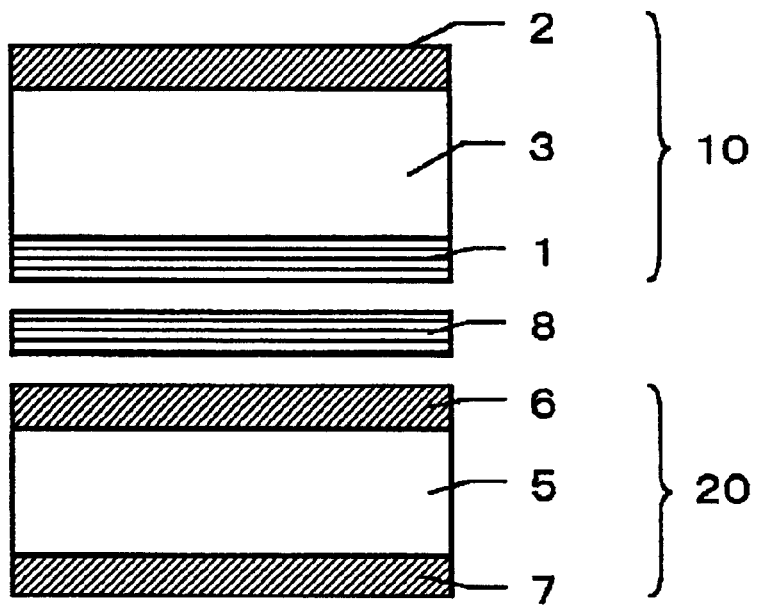
FIG. 3 is a cross sectional view schematically showing another example of a liquid crystal display device of the present invention.
Figure 4:
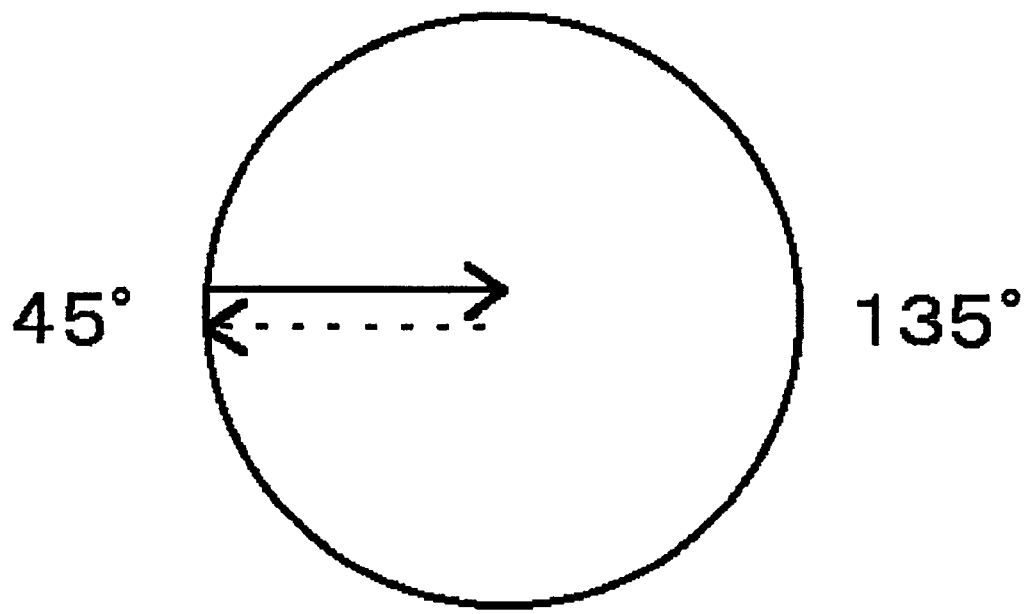
FIG. 4 shows a concept of polarizing conversion using a liquid crystal display which emits linear polarized light which is at 45 degrees in cross section on the equator on the Poincaré sphere when orientation axes of a λ/4-plate and a phase retarder are perpendicular to each other.
Figure 5:
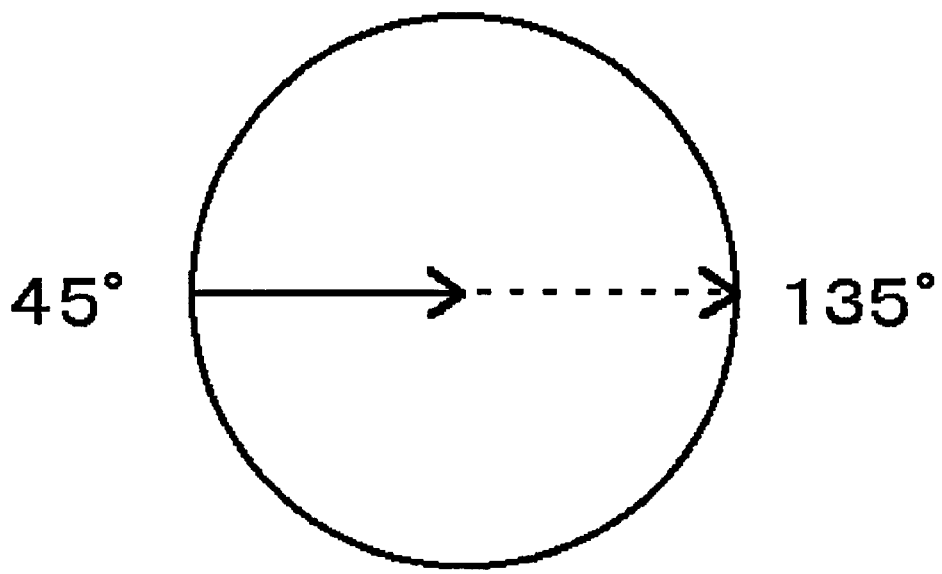
FIG. 5 shows a concept of polarizing conversion using a liquid crystal display which emits linear polarized light which is at 45 degrees in cross section on the equator on the Poincaré sphere when orientation axes of a λ/4-plate and a phase retarder are parallel to each other.
Figure 6:
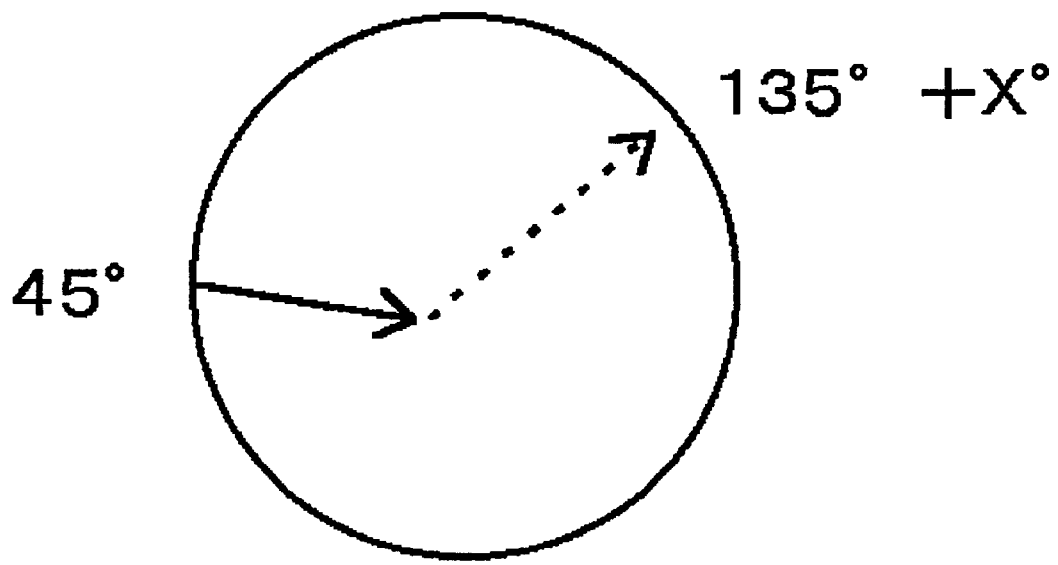
FIG. 6 shows a concept of polarizing conversion using a liquid crystal display which emits linear polarized light which is at 45 degrees in cross section on the equator on the Poincaré sphere when orientation axes of a λ/4-plate and a phase retarder are shifted 45 degrees or less.
Figure 7:
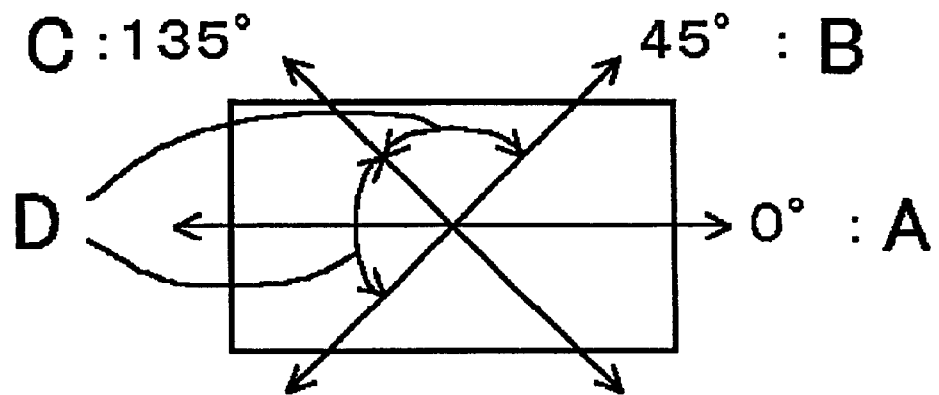
FIG. 7 is a schematic view which shows an example of a preferable angular arrangement for a polarizing plate, a phase retarder and an upper polarizing plate of a liquid crystal display when an orientation axis (optical axis) of a λ/4-plate is in the direction of 0 degree of the present invention.
Figure 8:
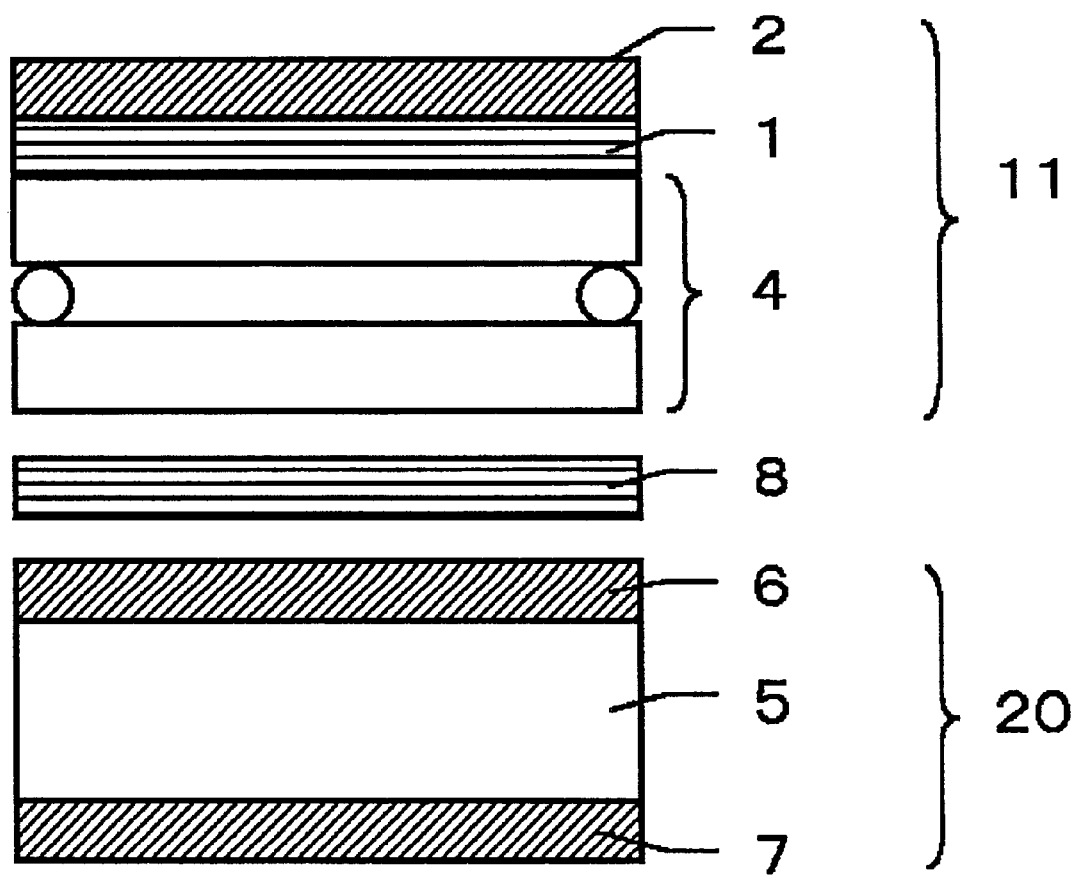
FIG. 8 is a cross sectional view schematically showing an example of a liquid crystal display device of the present invention wherein a resistive membrane type touch panel is used as a transparent protection plate.

Among the drawings, FIGS. 1 through 3 are cross sectional views schematically showing examples of a liquid crystal display device of the present invention. FIGS. 4 through 6 show a concept of polarizing conversion using a liquid crystal display which emits linear polarized light which is at an angle of 45 degrees in cross section on the equator on the Poincaré sphere, wherein the equator expresses a linear polarization condition in each direction of oscillations while the center (the north pole or the south pole) expresses a circular polarization condition. FIG. 4 represents the case where the direction of the orientation axes of a λ/4-plate and a phase retarder are perpendicular to each other, FIG. 5 represents the case where the direction of the orientation axes of the λ/4-plate and the phase retarder are parallel to each other, and FIG. 6 represents the case where the direction of the orientation axes of the λ/4-plate and the phase retarder are shifted 45 degrees or less. FIG. 7 is a drawing which shows an example of a preferable angular arrangement for a polarizing plate, a phase retarder and an upper polarizing plate of a liquid crystal display where the direction of the orientation axis (optical axis) of a λ/4-plate is in the direction of 0 degrees in the present invention. FIG. 8 is a cross sectional view schematically showing an example of a liquid crystal display device of the present invention wherein a resistive membrane type touch panel is used as a transparent protection plate.

In the liquid crystal display device shown in FIGS. 1 through 3, a λ/4-plate 1 and a polarizing plate 2 are combined with each other so that the direction of their optical axes is at about 45 degrees relative to each other, whereby a circular polarizing plate is formed. The circular polarizing plate functions as an anti-reflection filter which efficiently absorbs internal reflection which is caused by incident light from outside. The circular polarizing plate may be disposed to the front of a transparent protection plate 3 as shown in FIG. 1, or to the back as shown in FIG. 2, or separately as shown in FIG. 3. The λ/4-plate 1, the polarizing plate 2 and the transparent protection plate 3 form a laminated protection panel 10.

While a liquid crystal display 20 is usually formed of a liquid crystal display cell 5, an upper polarizing plate 6 and a lower polarizing plate 7 wherein these polarizing plates are arranged to the both surfaces of the liquid crystal display cell 5, the upper polarizing plate 6 may be omitted. It is preferable to omit the upper polarizing plate 6 if the brightness is regarded important, whereas it is preferable to have the upper polarizing plate 6 if the contrast is regarded as important.

The polarizing plate 2 can be used those usually available in the field of liquid crystal displays. It is preferable to use, for instance, a uni-axially oriented film or the like, which is made by absorbing a dichroic material such as iodine and a dichroic dye in a polyvinylalcohol resin and orienting. In a normal use, protection films are stacked upon the both surfaces of a uni-axially oriented film in which a dichroic material is absorbed and oriented. Protection films are also similarly stacked on each of the upper polarizing plate 6 and the lower polarizing plate 7, which form the liquid crystal display 20.

In the present invention, a phase retarder 8 whose wavelength dispersion is a specified value $\alpha_B$ due to a relationship with the λ/4-plate 1 is disposed between the laminated protection panel 10 and the liquid crystal display 20. The phase retarder 8 only needs be between the laminated protection panel 10 and the liquid crystal display 20, and therefore, maybe adhered to the back of the laminated protection panel 10 or to the front of the liquid crystal display 20, or alternatively, simply placed between the two. However, it is preferable to adhere to the front of the liquid crystal display 20, considering an anti-reflection effect.

Where the transparent protection plate 3 is disposed below the polarizing plate 2, the transparent protection plate 3 is preferably made of an optically isotropic material, which is suitably glass, a polymeric film not oriented, etc. Further, the transparent protection plate 3 may be a touch panel. If the touch panel is a touch panel of the resistive membrane type, the λ/4-plate 1, the polarizing plate 2 and the like may directly form a resistive membrane so as to serve also as an element which forms the touch panel.

In the present invention, the phase retarder 8 is disposed between the laminated protection panel 10 and the liquid crystal display 20 so that displaying light from the liquid crystal display 20 is efficiently transmitted through the laminated protection panel 10 which comprises a transparent protection plate and a circular polarizing plate which is formed by the λ/4-plate 1 and the polarizing plate 2, wherein materials of the λ/4-plate 1 and the phase retarder 8 is selected so that the sum ($\alpha_A+\alpha_B$) of the wavelength dispersion $\alpha_A$ of the λ/4-plate 1 which forms the laminated protection panel 10 and the wavelength dispersion $\alpha_B$ of the phase retarder 8 ranges from 1.11 to 1.95, and the direction of the orientation axis of the phase retarder 8 may be within 0±45 degrees or 90±45 degrees with respect to the direction of the orientation axis of the λ/4-plate. As the result, it is possible to convert a polarized condition of the displaying light from the liquid crystal display 20 in excellent balance of the three primary colors of red, green and blue, and therefore, ensure efficient transmission through the protection plate.

Oriented polymeric films are usually used as the λ/4-plate 1 and the phase retarder 8. Their wavelength dispersion values $\alpha_A$ and $\alpha_B$ are intrinsic to a material as described above, and hence, the materials of the λ/4-plate 1 and the phase retarder 8 may be selected so as to satisfy the requirement above, that is, $(\alpha_A+\alpha_B)$ is in the range of 1.11 to 1.95. Examples of the λ/4-plate 1 and the phase retarder 8 include a polynorbornene film (α=1.00), a triacetyl cellulose film (α=0.93), apolycarbonate film (α=1.07), and also a phase retarder under the name of "PureAceWRW-142" (α=0.83) available from Teijin Limited. In the case of a copolymer film, its wavelength dispersion value α can be controlled by the copolymerization ratio of components. Accordingly, many kinds of copolymer film are applicable to the present invention.

A concept of polarizing conversion using a liquid crystal display which emits linear polarized light which is at 45 degrees, if described using the Poincaré sphere (a spherical surface in which each point on the sphere shows a state of polarization), is illustrated as shown in FIGS. 4 through 6. These drawings show the Poincaré sphere as a projection upon a cross section, which is on the equator. The solid arrows denote conversion by the phase retarder 8, whereas the dotted arrows denote conversion by the λ/4-plate 1. Where two λ/4-plates are arranged perpendicular to each other, the original condition of polarization is realized through the same trajectory as shown in FIG. 4. In contrast, in a preferred embodiment of the present invention, as shown in FIGS. 5 and 6, polarizing conversion occur into a different direction by the different combination of the directions of the orientation axes of the phase retarder 8 and the λ/4-plate 1. At this stage, dispersion of the three primary colors of red, green and blue is prevented by such combination of the λ/4-plate 1 and the phase retarder 8 so that $(\alpha_A+\alpha_B)$ is in the range of 1.11 to 1.95. If the λ/4-plate 1 and the phase retarder 8 are arranged so that their orientation axes are parallel to each other, conversion occurs as shown in FIG. 5. In some cases, unevenness in the three primary colors of red, green and blue is reduced with the orientation axes of the λ/4-plate 1 and the phase retarder 8 arranged somewhat shifted against each other rather than parallel to each other, if $(\alpha_A+\alpha_B)$ is larger than 1.53. The conversion at this stage follows a trace as that shown in FIG. 6. In this case, as shown in FIG. 6, it sometimes becomes necessary to revolve the angles at which the λ/4-plate 1 and the polarizing plate 2 forming the laminated protection panel 10 are disposed.

FIG. 7 shows an example of a preferable angular arrangement for the polarizing plate 2, the phase retarder 8 and the upper polarizing plate 6 of the liquid crystal display 20 when the direction of the orientation axis (optical axis) of the λ/4-plate 1 is in the direction of 0 degree. The polarizing plate 2, which forms the circular polarizing plate together with the λ/4-plate 1, is disposed at an angle of 45 degrees with respect to the direction of the optical axis (A) of the λ/4-plate 1. On the other hand, the upper polarizing plate 6 of the liquid crystal display is arranged to have its optical axis (absorption axis) (C) at an angle of 135 degrees with respect to the direction of the long side of the liquid crystal display, so that linear polarized light is emitted at angle of 45 degrees. The directions of the optical axis (B) of the polarizing plate 2 and the optical axis (C) of the upper polarizing plate 6 may be opposite to FIG. 7, that is, the optical axis of the polarizing plate 2 may be at an angle of 135 degrees and the optical axis of the upper polarizing plate 6 may be at angle of 45 degrees. The phase retarder 8 is disposed so that its optical axis (D) is parallel to the optical axis (A) of the λ/4-plate 1, is perpendicular to the optical axis, is at an angle within ±45 degrees from the direction parallel to the optical axis, or is at an angle within ±45 degrees from the direction perpendicular to the optical axis. If the direction of the optical axis (D) of the phase retarder 8 is shifted to a certain extent from the direction of the optical axis (A) of the λ/4-plate 1, as described earlier, the angle at which the λ/4-plate 1 is disposed is slightly rotated, in this case, the optical axis of the polarizing plate 2 as well is correspondingly rotated. The optical axis of the upper polarizing plate 6 may change.

Next, a viewing angle will be described. In the structure as that described as the conventional technique wherein the direction of the optical axes of two λ/4-plates are perpendicular to each other, a polarizing condition fails to be cancelled out in an oblique direction by retardation changes in angle, and therefore, coloring due to dispersion of the three primary colors occurs, i.e., displaying light becomes yellowish. In contrast, in the present invention wherein the sum $(\alpha_A+\alpha_B)$ of the wavelength dispersions of the λ/4-plate 1 and the phase retarder 8 is in the range of 1.11 to 1.95, since the three primary colors of red, green and blue are converted into approximately same conditions of polarization in excellent balance, the yellowness in an oblique direction as well is improved.

In the liquid crystal display device of the present invention, a surface of the laminated protection panel 10 may have an additional function. For example, a transparent hard coat layer for prevention of scratching may be disposed to the surface. The hard coat layer may be formed with applying a hard coat agent or adhering a hard coat film. Further, for the purpose of preventing reflection of external light, an anti-glare layer may be formed which irregularly reflects external light by means of fine irregular patterns at the surface, or an anti-reflection layer may be formed which is a layer of a number of dielectric thin films. Still further, a transparent hard coat film in which anti-reflection layer is formed may be adhered, or alternatively, anti-reflection layer may be formed on a hard coat layer.

EXAPLES

In the following, the present invention will be described in further detail with reference to examples, which however do not limit the present invention.

Now, a description will be given while referring to the reference figures in the drawing when necessary, in relation to examples of a touch-panel type liquid crystal display device which comprises an isotropic touch panel of the resistive membrane type as a transparent protection plate and has the layer structure as that shown in FIG. 8 which includes (polarizing plate 2)/(λ/4-plate 1)/(touch panel 4)/(phase retarder 8)/(liquid crystal display 20) in this order from the top. Retardation values in the examples are values at a wavelength of 550 nm.

The measurement of luminance was conducted using a photometer MCPD manufactured by Otsuka Electronics Co., Ltd.

Example 1

A polynorbornene film (under the trade name of "Artone" available from JSR Corporation) was uniaxially oriented, thereby obtaining the λ/4-plate 1 whose wavelength dispersion $\alpha_A$ was 1.00 and retardation value was 138 nm. The λ/4-plate 1 and the polarizing plate 2 (under the trade name of SUMIKALAN SQW852A available from Sumitomo Chemical Co., Ltd.) were adhered to each other such that the direction of the orientation axis of the λ/4-plate 1 was at 0 degree and the direction of the absorption axis of the polarizing plate 2 was at 45 degrees, and the obtained laminate was adhered, with the λ/4-plate 1 facing down, on a top surface of the isotropic touch panel 4 of the resistive membrane type, whereby a touch panel 11 with a circular polarizing plate was obtained.

Meanwhile, triacetyl cellulose film (available from Konica Corporation) was uniaxially oriented, thereby obtaining the phase retarder 8 whose wavelength dispersion $\alpha_B$ was 0.93 and retardation value was 110 nm. The phase retarder 8 was adhered to a back surface of the touch panel above with the circular polarizing plate so that the direction of the orientation axis of the phase retarder 8 was at 0 degree. The touch panel 4 now laminating the circular polarizing plate adhered to the top surface and the phase retarder 8 adhered to the bottom surface was disposed on the liquid crystal display 20 in which the direction of the absorption axis of the upper polarizing plate 6 was at 135 degrees, in such a manner that the phase retarder 8 and the upper polarizing plate 6 were in contact, whereby the touch-panel type liquid crystal display device was obtained.

The evaluation result is shown in Table 1.

Example 2

The phase retarder 8 (under the trade name of "Pure Ace WR W-142" available from Teijin Limited) whose wavelength dispersion $\alpha_B$ was 0.83 and retardation value was 138 nm was adhered to the surface of the liquid crystal display 20 in which the direction of the absorption axis of the upper polarizing plate 6 was at 135 degrees, in such a manner that the direction of the orientation axis of the phase retarder 8 was at 0 degree. The touch panel 11 with a circular polarizing plate similar to the above in Example 1 was disposed on the phase retarder 8 side (the upper side) so that the direction of the orientation axis of the λ/4-plate 1 was at 0 degree, whereby the touch-panel type liquid crystal display device was obtained.

The evaluation result is shown in Table 1.

Example 3

The λ/4-plate 1 obtained in Example 1 and the polarizing plate 2 were adhered to each other such that the direction of the orientation axis of the λ/4-plate 1 was at 0 degree and the direction of the absorption axis of the polarizing plate 2 was at 135 degrees, and the obtained laminate was adhered, with the λ/4-plate 1 facing down, on a top surface of the isotropic touch panel 4 of the resistive membrane type, whereby the touch panel 11 with a circular polarizing plate was obtained. Meanwhile, the phase retarder (under the trade name of "Pure Ace WR W-142" available from Teijin Limited) 8 was wavelength dispersion $\alpha_B$ was 0.83 and retardation value was 138 nm was adhered to the surface of the liquid crystal display 20 in which the direction of the absorption axis of the upper polarizing plate 6 was at 135 degrees, in such a manner that the direction of the orientation axis of the phase retarder 8 was at 90 degrees. The bottom surface of the touch panel 11 with the circular polarizing plate (the touch panel side) was disposed on the top surface of the liquid crystal display 20 with the phase retarder (the phase retarder side), whereby the touch-panel type liquid crystal display device was obtained.

The evaluation result is shown in Table 1.

Comparative Example 1

The λ/4-plate 1 obtained in Example 1 and the polarizing plate 2 were adhered to each other such that the direction of the orientation axis of the λ/4-plate 1 was at 0 degree and the direction of the absorption axis of the polarizing plate 2 was at 135 degrees, and the obtained laminate was adhered, with the λ/4-plate 1 facing down, on a top surface of the isotropic touch panel 4 of the resistive membrane type, whereby the touch panel 11 with a circular polarizing plate was obtained. Meanwhile, a phase retarder made of polycarbonate (under the trade name of "SEF340138B" available from Sumitomo Chemical Co., Ltd.) whose wavelength dispersion $\alpha_B$ was 1.07 and retardation value was 138 nm, was adhered to the surface of the liquid crystal display 20 in which the direction of the absorption axis of the upper polarizing plate 6 was at 135 degrees, in such a manner that the direction of the orientation axis of the phase retarder was at 90 degrees. The bottom surface of the touch panel 11 with the circular polarizing plate (the touch panel side) was disposed on the top surface of the liquid crystal display 20 with the phase retarder 8 (the phase retarder side), whereby the touch-panel type liquid crystal display device was obtained.

The evaluation result is shown in Table 1.

Comparative Example 2

The same phase retarder as that used in Comparative Example 1 was used as the λ/4-plate 1, and the λ/4-plate 1 and the polarizing plate 2 were adhered to each other such that the direction of the orientation axis of the λ/4-plate 1 was at 0 degree and the direction of the absorption axis of the polarizing plate 2 was at 45 degrees, and the obtained laminate was adhered, with the λ/4-plate 1 facing down, on a top surface of the isotropic touch panel 4 of the resistive membrane type, whereby the touch panel 11 with a circular polarizing plate was obtained. Meanwhile, another same phase ratarder as that used in Comparative Example 1 was adhered to the surface of the liquid crystal display 20 in which the direction of the absorption axis of the upper polarizing plate 6 was at 135 degrees, in such a manner that the direction of the orientation axis of the phase retarder was at 0 degree. The bottom surface of the touch panel 11 with the circular polarizing plate (the touch panel side) was disposed on the top surface of the liquid crystal display 20 with the phase retarder 8 (the phase retarder side), whereby the touch-panel type liquid crystal display device was obtained.

The evaluation result is shown in Table 1.

TABLE 1

Luminance levels in the respective examples are conversion values when the front luminance in Comparative Example 1 is assumed to be 100%.

| | $\alpha_A + \alpha_B$ | Axial Angle of Phase retarder | Direction of Evaluation | Luminance | | | Displayed view |
|---|---|---|---|---|---|---|---|
| | | | | 435 nm | 545 nm | 612 nm | |
| Example 1 | 1.93 | 0° | Front | 98% | 98% | 92% | excellent |
| | | | at 40° to the right | 67% | 57% | 51% | excellent |
| Example 2 | 1.83 | 0° | Front | 98% | 100% | 98% | excellent |
| | | | at 40° to the right | 71% | 68% | 63% | excellent |
| Example 3 | 1.83 | 90° | Front | 99% | 100% | 101% | excellent |
| | | | at 40° to the right | 76% | 66% | 67% | excellent |
| Comparative Example 1 | 2.07 | 90° | Front | 100% | 100% | 100% | excellent |
| | | | at 40° to the right | 56% | 65% | 68% | yellowish |
| Comparative Example 2 | 2.14 | 0° | Front | 59% | 100% | 98% | yellowish |
| | | | at 40° to the right | 66% | 57% | 49% | excellent |

In Comparative Example 1, while a displayed view from the front was excellent, a displayed view from the side was colored yellowish. In Comparative Example 2, although a displayed view from the side was not yellowish, a displayed view from the front was yellowish, and therefore, this was not suitable as a display device. Unlike these, in Example 1, a displayed view from the front was slightly bluish but only to such an extent that did not cause a concern, and a displayed view from the side was excellent without getting colored in yellow. In Example 2 and Example 3, both a displayed view from the front and a displayed view from the side were further improved, providing a wide viewing angle.

Thus, the present invention provides a liquid crystal display device which is equipped with an anti-reflection function, excellent in visibility, and adaptable to the touch panel type and the like, and further, improves in viewing angle characteristic.

What is claimed is:

1. A liquid crystal display device comprising:
   a laminated protection panel composed of a λ/4-plate, a polarizing plate and a transparent protection plate;
   a liquid crystal display; and
   a phase retarder;
      wherein the laminated protection panel is disposed to a top surface of the liquid crystal display with a distance, the phase retarder is disposed between the laminated protection panel and the liquid crystal display, and the sum ($\alpha_A+\alpha_B$) of a wavelength dispersion ($\alpha_A$) of the λ/4-plate and a wavelength dispersion ($\alpha_B$) of the phase retarder is in the range of 1.11 to 1.95.

2. The liquid crystal display device according to claim 1, wherein a direction of an orientation axis of the phase retarder is in the range of 0±45 degrees with respect to a direction of an orientation axis of the λ/4-plate which forms the laminated protection panel.

3. The liquid crystal display device according to claim 1, wherein a direction of an orientation axis of the phase retarder is in the range of 95±45 degrees with respect to a direction of an orientation axis of the λ/4-plate which forms the laminated protection panel.

4. The liquid crystal display device according to any one of claims 1 to 3, wherein the transparent protection plate is disposed to the liquid crystal display side within the laminated protection panel.

5. The liquid crystal display device according to any one of claims 1 to 3, wherein the λ/4-plate is disposed to the liquid crystal display side within the laminated protection panel.

6. The liquid crystal display device according to any one of claims 1 to 3, wherein an upper polarizing plate does not exist in the liquid crystal display.

7. The liquid crystal display device according to any one of claims 1 to 3, wherein the transparent protection plate is a touch panel.

8. The liquid crystal display device according to any one of claims 1 to 3, wherein the laminated protection panel has a hard coat layer at the outer-most surface of the laminated protection panel.

9. The liquid crystal display device according to any one of claims 1 to 3, wherein the laminated protection panel has an anti-reflection layer at the outer-most surface of the laminated protection panel.

* * * * *